Figure 1:
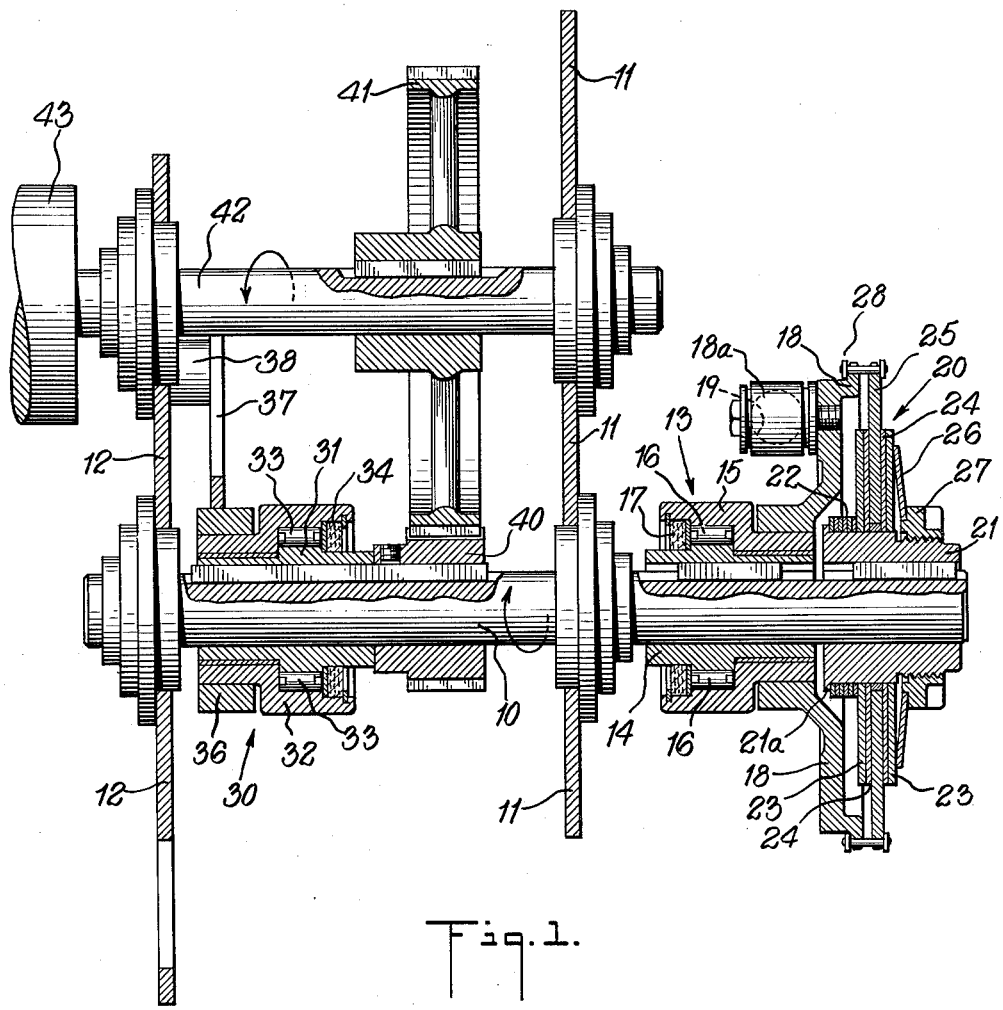

INVENTOR.
FRANK B. MORRILL

April 25, 1961 F. B. MORRILL 2,981,118
STEP-BY-STEP FEED MECHANISM
Filed Sept. 25, 1958 2 Sheets-Sheet 2

INVENTOR.
FRANK B. MORRILL
BY
ATTORNEYS

United States Patent Office 2,981,118
Patented Apr. 25, 1961

2,981,118

STEP-BY-STEP FEED MECHANISM

Frank B. Morrill, North Adams, Mass., assignor to James Hunter Machine Company, North Adams, Mass., a corporation of Massachusetts Filed Sept. 25, 1958, Ser. No. 763,401

4 Claims. (Cl. 74—142)

This invention relates to feed mechanisms of the step-by-step type, driven from an oscillating member through an indexing clutch. The invention has particular reference to an improved feed mechanism of this type in which the feed roll or other driven element is effectively braked upon completion of the indexing or feed stroke of the oscillating driving member, the braking means, however, imposing no resistance to the feed stroke of the oscillating member but acting to transmit some of the driving force of this member during the feeding stroke.

In feeding mechanisms of the type described, it is customary to employ a stationary brake for arresting the inertial movement of the driven member during the return or free stroke of the oscillating driving member. This arrangement has the disadvantage that it is necessary to overcome the friction of the stationary brake in the forward or feeding stroke of the oscillating member in order to have the operation in the return stroke of this member. Thus, the greater the braking action on the driven member to prevent it from being over-driven due to its inertia or momentum, the greater the resistance which must be overcome by the oscillating driving member in its feeding stroke.

The principal object of the present invention is to provide a step-by-step feed mechanism which overcomes the above noted disadvantage.

A feed mechanism made according to the invention comprises an indexing clutch connecting the oscillating driving member to a shaft and through which this member is operable in its advance stroke to rotate the shaft in one direction, the clutch disconnecting the shaft from the oscillating member in its return stroke. A friction clutch also connects the oscillating driving member to the shaft, the connection through the friction clutch being independent of the connection through the indexing clutch. Thus, the friction clutch assists the indexing clutch in driving the shaft in one direction in the forward or feed stroke of the oscillating member, and this member in its return stroke is operable through the friction clutch to arrest the inertial rotation of the shaft in the aforesaid direction. The feed mechanism also comprises a back-stopping device connecting the shaft to a stationary stop and through which the stop is operable to prevent rotation of the shaft in the direction opposite to the aforesaid direction. Because of this back-stopping device, the friction clutch, while operable to brake the shaft as above described, is inoperable to drive the shaft in the aforesaid opposite direction during the return stroke of the oscillating driving member.

Figure 2:
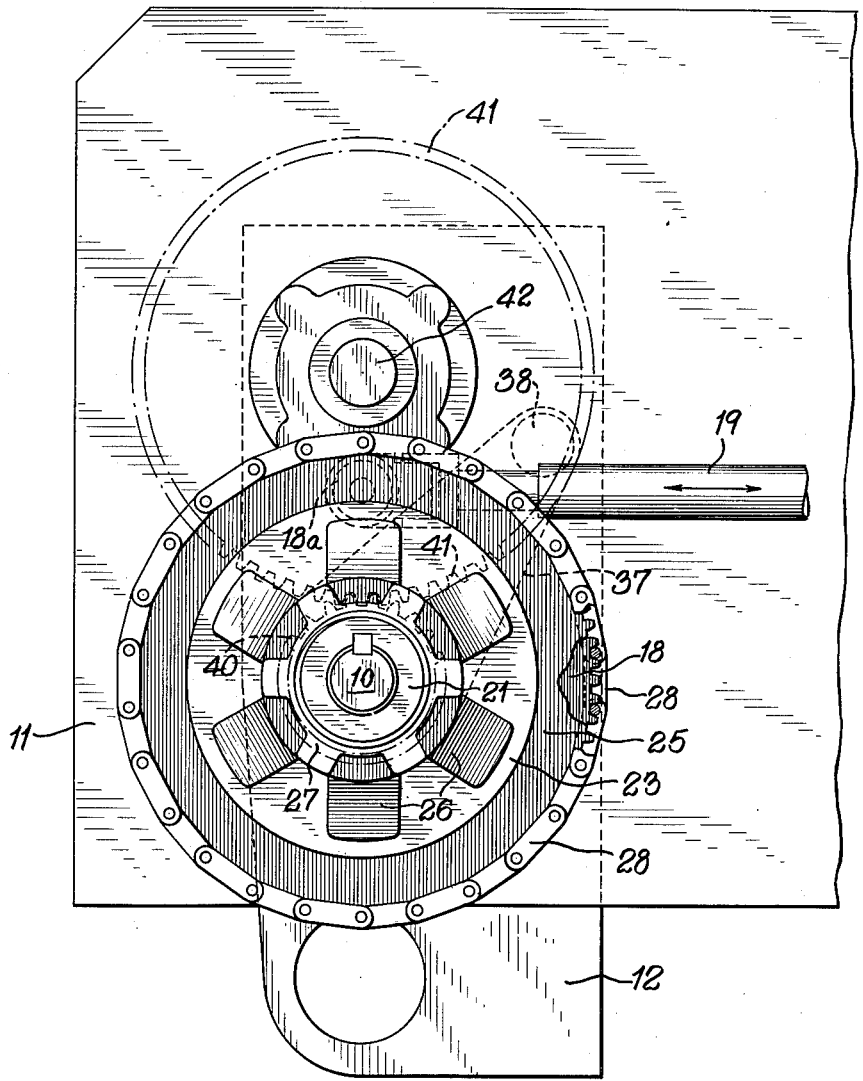

For a better understanding of the invention, reference may be had to the accompanying drawings, in which:

Fig. 1 is a vertical sectional view of a preferred form of the new feed mechanism, and Fig. 2 is an end view of the feed mechanism shown in Fig. 1.

Referring to the drawings, the reference numeral 10 designates a shaft rotatably mounted in a pair of spaced vertical supporting plates 11 and 12. The shaft has a part projecting from the plate 11 and provided with an over-running or indexing clutch shown generally at 13. The clutch 13 may be of any suitable construction, such as the roller type of over-running clutch; but it is preferably a "Formsprag" clutch. The latter clutch is well-known in the art and comprises an inner race 14 keyed to the shaft 10, an outer race 15 rotatably mounted on the inner race, and a series of sprags 16 located in an annular space between the races 14—15, this annular space being sealed by an oil seal 17. The sprags 16 are so arranged that the outer race 15 drives shaft 10 counterclockwise (as viewed from the left in Fig. 1), the sprags permitting this outer race to rotate freely in the clockwise direction relative to the inner race 14 and the shaft 10.

An oscillating driving member 18 is keyed to an extension of the outer race 15. The driving member 18 is in the form of a sprocket and is adapted to be oscillated by a reciprocating arm 19 which is connected to the sprocket 18 through a pivotal connection 18a. Thus, when the arm 19 turns the sprocket 18 counterclockwise (as viewed from the left in Fig. 1) the clutch 13 drives shaft 10 in the same direction with an indexing movement; but in the return movement of the arm 19, when sprocket 18 is turned clockwise (as viewed from the left in Fig. 1), the outer race 15 rotates freely relative to the shaft 10. In other words, the power stroke of the driving arm 19 turns the oscillating drive member 18 in the counterclockwise direction (as viewed from the left in Fig. 1), and the return stroke of driving arm 19 turns the oscillating member 18 clockwise.

A friction clutch 20 is mounted on the shaft 10 adjacent the indexing clutch 13. This friction clutch comprises a threaded hub 21 splined on the shaft 10, spacers 22 engaging the shoulder 21a on the hub, steel discs 23 mounted on the hub, clutch facings 24 on opposing faces of these discs, and a sprocket 25 forming the central plate of the clutch, this sprocket being loosely mounted on the hub between facings 24. A Belleville spring 26 engages the outer face of the outer disc 23 and is adapted to be tightened against this disc by an adjusting nut 27 threaded on the hub 21. It will be understood that due to the friction between the facings 24 and the sprocket 25, rotation of the sprocket in either direction acts to drag the hub 21 and therefore the shaft 10 along with the sprocket, the force needed to overcome this friction being determined by adjustment of the nut 27.

The two sprockets 18 and 25 are interconnected by a chain 28, which extends tightly around the sprockets and engages their teeth. Consequently, sprocket 25 of the friction clutch 20 moves in unison with the oscillating driving member 18.

A one-way engaging device 30 is mounted on shaft 10 between the supporting plates 11—12. The device 30 is similar to clutch 13 and includes an inner race 31 keyed to shaft 10, an outer race 32 rotatable on the inner race, and sprags 33 located in an annular space between the two races, this annular space being closed at one end by an oil seal 34. The sprags 33 are so arranged that the outer race 32 is adapted to drive the shaft 10 in the counterclockwise direction, as viewed from the left in Fig. 1. A collar 36 keyed to an extension of the outer race 32 is rigidly secured to an arm 37 having a detent 38, which, in turn, is secured to the vertical plate 12. Thus, the one-way engaging device 30 permits rotation of shaft 10 in the counterclockwise direction (as viewed from the left in Fig. 1) but rotation of this shaft in the opposite direction is prevented by the rigid connection of the outer race 32 to the stationary plate 12 through the parts 36—38.

In the forward or power stroke of the oscillating driving member 18, the shaft 10 is driven counterclockwise (as viewed from the left in Fig. 1) through the indexing clutch 13 and also through the friction clutch 20. That is, the friction clutch 20, being connected in parallel with the over-running clutch 13, assists the latter clutch in driving the shaft 10 from the driving member 18. In the return stroke of driving member 18 (clockwise as viewed from the left in Fig. 1), the outer race 15 of clutch 13 rotates freely relative to shaft 10, but the central plate 25 of the friction clutch 20 acts through the clutch facings 24 to brake the inertial rotation of shaft 10 in the counterclockwise direction (as viewed from the left in Fig. 1), as the plate 25 is now being turned by the driving member 18 in the opposite direction. In fact, the friction clutch 20 would actually rotate shaft 10 in the clockwise direction (as viewed from the left in Fig. 1) if it were not for the one-way engaging device 30 which prevents such rotation. It will be apparent, therefore, that after each indexing stroke of the oscillating driving member 18, the driven shaft 10 is effectively braked by the friction clutch 20, not only during the instant when the driving member 18 is reversing its direction of rotation, but also as this driving member proceeds through its return or free stroke. At the instant when the shaft 10 is brought to rest at the end of the indexing stroke, the back stopping device 30 comes into action to prevent reverse rotation of the shaft by the friction clutch 20 as the driving member 18 completes its return stroke. During this dwell period of the shaft 10, the central plate 25 of the friction clutch slides relative to the clutch facings 24.

As shown in Fig. 1, the shaft 10 is connected through gears 40 and 41 to a parallel shaft 42, which may carry a feed roll 43 of a needle loom.

The part 30 may be referred to as a one-way engaging device; and this part, the anchoring stop 12 and the connecting means 36—38 form in effect a backstopping device which prevents rotation of the shaft by the friction clutch during the return stroke of the oscillating member 19.

I claim:

1. In a step-by-step feed mechanism, the combination of an oscillating driving member having advance and return strokes, a rotatable shaft, a one-way clutch, means connecting the oscillating member to the shaft through said one-way clutch and through which said member is operable in its advance stroke to rotate the shaft in one direction, the clutch disconnecting the shaft from the oscillating member in its return stroke, a friction clutch connecting the oscillating member to the shaft independently of the one-way clutch, whereby said member in its return stroke is operable through the friction clutch to arrest inertial rotation of the shaft in said one direction, an anchoring stop, and a one-way engaging device connecting the shaft to the anchoring stop and forming with said anchoring stop a backstopping device operable to prevent rotation of the shaft in the direction opposite to said one direction and permit rotation of the shaft in said one direction, whereby the friction clutch is inoperable to drive the shaft in said opposite direction during said return stroke of the oscillating driving member.

2. The combination according to claim 1, in which said clutches and one-way engaging device are mounted on the shaft.

3. The combination according to claim 1, in which said one-way clutch is mounted on the shaft and includes an outer rotatable element, the oscillating driving member being mounted on and secured to said outer element, the friction clutch being mounted on the shaft adjacent said one-way clutch and including a friction plate coupled to said driving member.

4. The combination according to claim 1, in which said one-way clutch is mounted on the shaft and includes an outer rotatable element, the oscillating driving member being a sprocket mounted on and secured to said outer element, the friction clutch being mounted on the shaft adjacent said one-way clutch and including a sprocket forming a friction plate, the combination comprising also a chain interconnecting said sprockets.

References Cited in the file of this patent

UNITED STATES PATENTS

| | | |
|---|---|---|
| 2,282,945 | Demarest | May 12, 1942 |
| 2,801,553 | Reynolds | Aug. 6, 1957 |